United States Patent [19]
Tsuda et al.

[11] Patent Number: 6,125,003
[45] Date of Patent: Sep. 26, 2000

[54] DISK DRIVE HAVING PIVOTALLY MOUNTED SHROUD

[75] Inventors: Shingo Tsuda, Yokohama; Akira Morita, Zama; Yoshitaka Kakizaki, Yokohama, all of Japan

[73] Assignee: International Business Machines Corporation, Armonk, N.Y.

[21] Appl. No.: 09/183,394

[22] Filed: Oct. 29, 1998

[30] Foreign Application Priority Data

Oct. 29, 1997 [JP] Japan ................................. 9-297239

[51] Int. Cl.⁷ ....................................... G11B 17/02
[52] U.S. Cl. ............................................. 360/97.03
[58] Field of Search ........................ 360/97.01–97.04, 360/98.01

[56] References Cited

U.S. PATENT DOCUMENTS

| | | | |
|---|---|---|---|
| 5,212,679 | 5/1993 | Tohkairin | 360/97.03 |
| 5,631,787 | 5/1997 | Huang et al. | 360/97.02 |
| 5,696,649 | 12/1997 | Boutaghou | 360/97.03 |
| 5,898,545 | 4/1999 | Schirle | 360/97.02 |
| 5,907,453 | 5/1999 | Wood et al. | 360/97.02 |

FOREIGN PATENT DOCUMENTS

| | | |
|---|---|---|
| 61-170194 | 7/1986 | Japan . |
| 07320478 | 12/1995 | Japan . |

*Primary Examiner*—Robert S. Tupper
*Attorney, Agent, or Firm*—Robert B. Martin

[57] ABSTRACT

The present invention is an after-assembly shroud in a magnetic disk drive. The shroud of the present invention is attached to a housing after assembly of the disk drive and actuator near the circumferential edge of the disk. The disk is attached to the housing of a magnetic disk drive so that it is rotatable with respect to the housing. The invention relates to a fabrication method for the magnetic disk drive. The assembly method is adapted for attaching the shroud to the housing of the disk drive after assembly and is performed according to novel assembly sequence. The shroud of the present invention reduces disk flutter due to turbulent air flow, and track positioning precision can be enhanced.

3 Claims, 9 Drawing Sheets

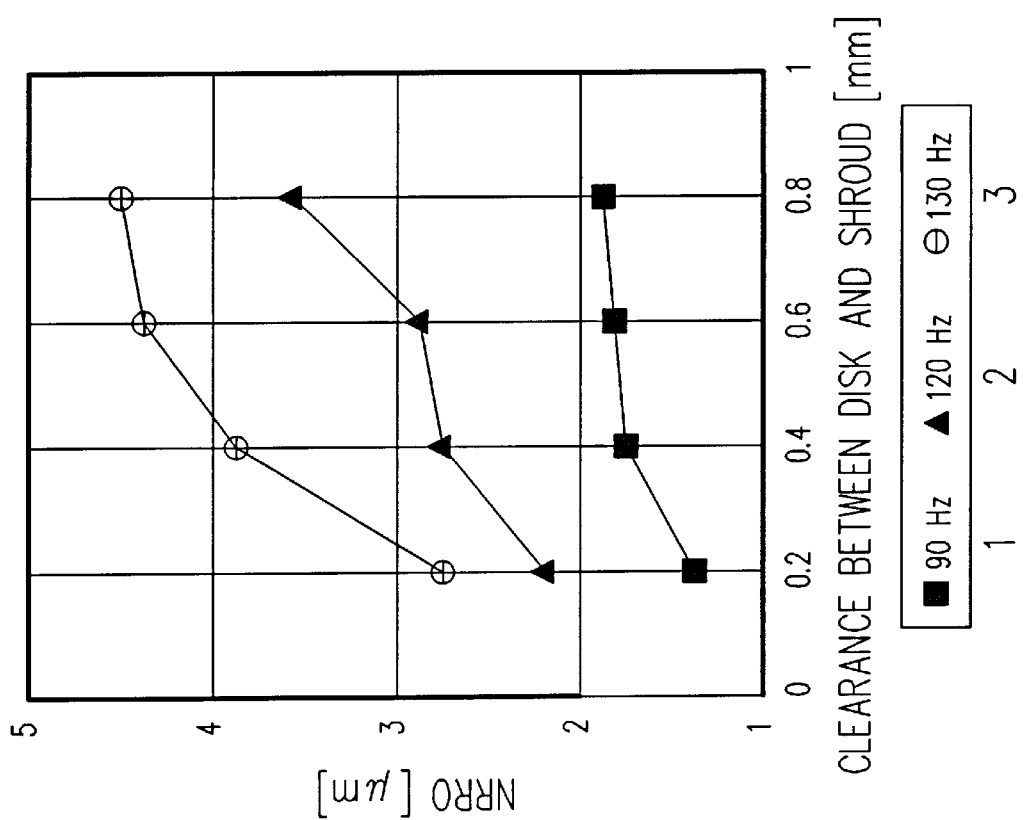
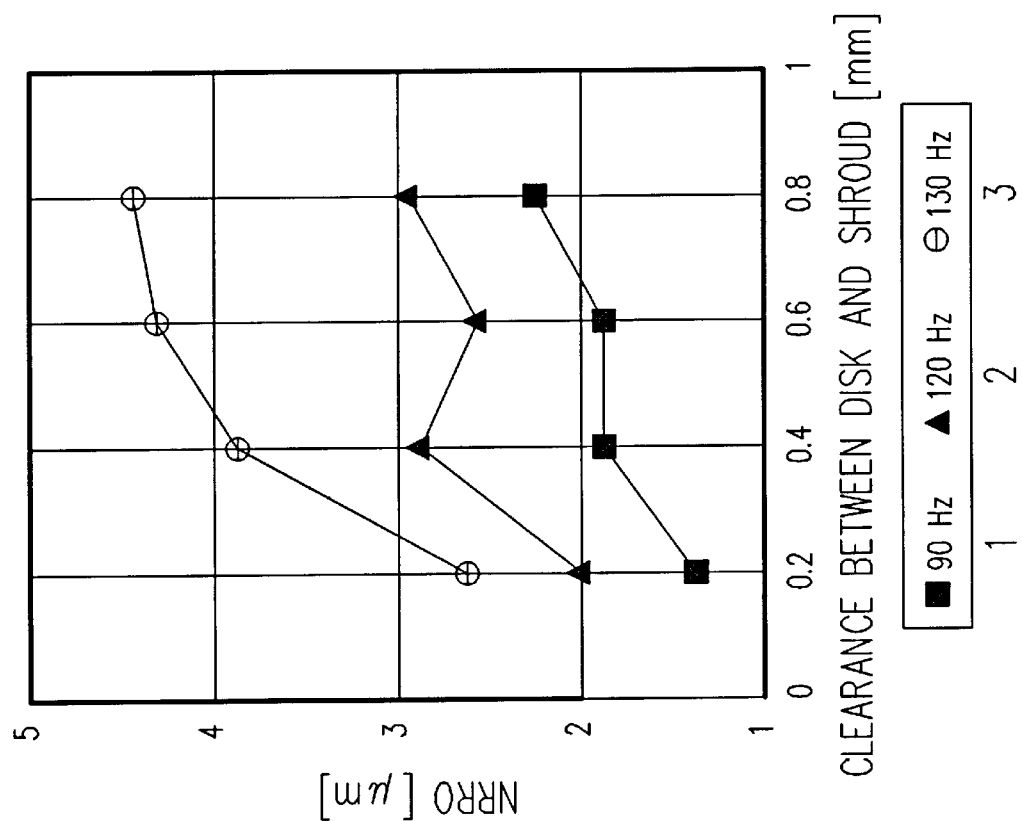
FIG. 7A
FIG. 7B

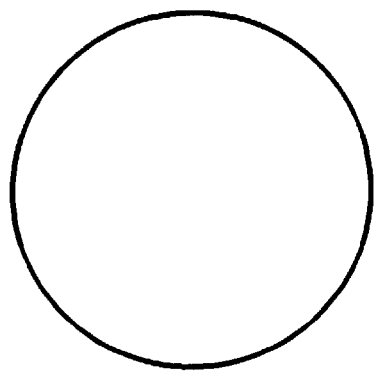
FIG. 8A  00 MODE
(UMBRELLA MODE)
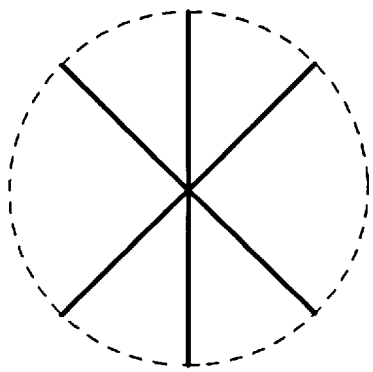
FIG. 8D  03 MODE
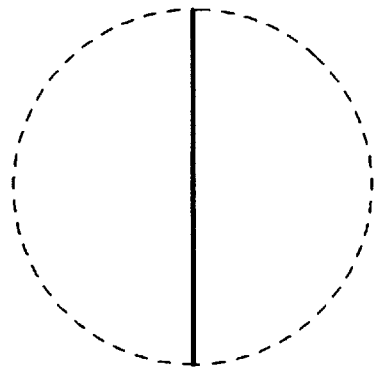
FIG. 8B  01 MODE
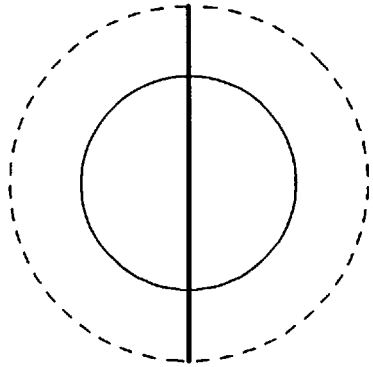
FIG. 8E  11 MODE
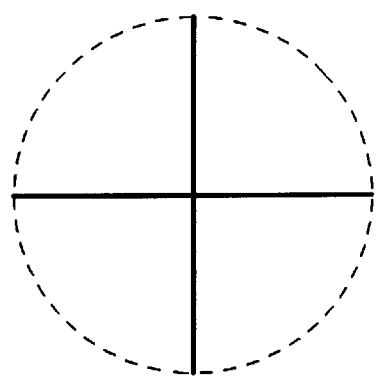
FIG. 8C  02 MODE

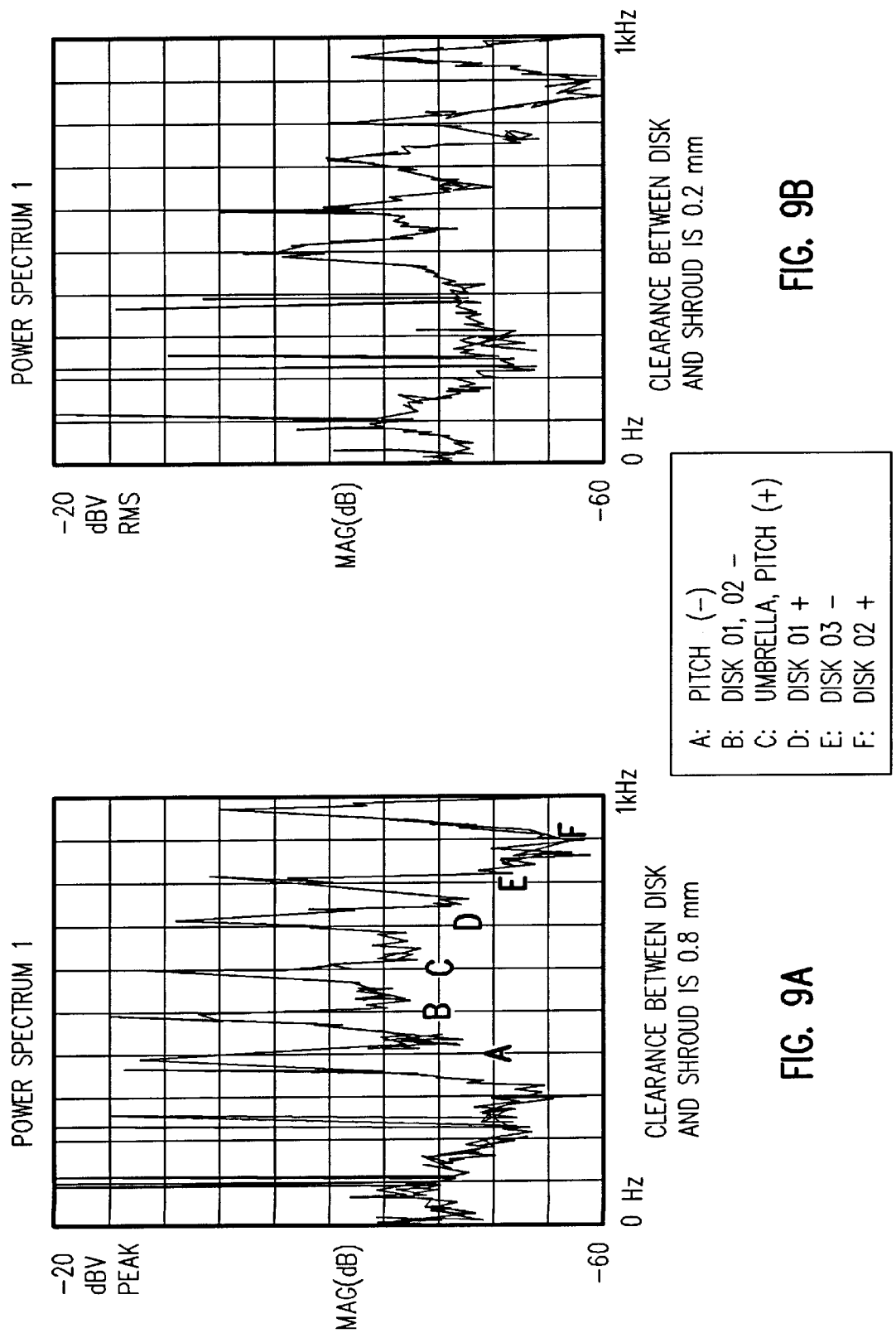

DISK DRIVE HAVING PIVOTALLY MOUNTED SHROUD

BACKGROUND OF THE INVENTION

1. Field of the Invention

The present invention relates to proper adjustment of air flow created by rotation of the disk in disk storage systems. More specifically, the invention relates to adjusting air flow in a hard disk drive by provision of an after-assembly component, thereby reducing disk flutter.

2. Background Art

FIG. 1 is a block diagram showing the essential elements and operation of a hard disk drive (HDD) 10. The HDD 10 incorporates a disk 12 therein. (There are cases where a plurality of disks are integrally formed into a stacked structure like 12' and 12". In the following description, superscripts ' and " represent similar members.) When the disk 12 is being rotated on a spindle 14 by a motor 16, data read and write operations can be performed by a positioning operation with respect to the disk 12.

More specifically, an actuator is rotatably attached so that a head 18 (18' and 18" which include a magnetic read sensor and a magnetic write transducer) can be positioned over the rotating disk surface 13 (13' and 13"). The actuator generally includes a suspension 20 (20' and 20") and an actuator arm 22 (22' and 22"). The actuator is rotated on a rotational shaft as a unit by an actuator drive mechanism 24 so that it is positioned over a desired data track on the disk surface. The rotation of this actuator mechanism 24 is controlled by a control unit 26. The actuator drive mechanism 24 typically employs a voice coil motor (VCM). In addition, the operation of the motor 16 and the read and write operations of the magnetic head 18 are controlled by the control unit 26.

FIG. 2 is a plan view of the HDD 10 shown in FIG. 1. As seen in FIG. 2, a housing 30 is required to enclose all parts shown in FIG. 1. The spatial arrangement of the parts in the depth direction of the paper surface is shown in FIGS. 6(b) and (c). Covers are provided on the bottom (depth side of the paper surface of FIG. 2) and top (on this side of the paper surface or on the upper side of FIG. 6(b) or (c)) to form an enclosure with exterior walls of the housing 30. Therefore, the air flow which is generated by rotation of the disk 12 experiences hydrodynamic mutual action between these exterior walls. The details of this mutual action will be described later.

The high density and large capacity in the HDD has been supported by techniques for a reduction in the spacing between the head and the disk and by high precision head positioning. For this reason, in the design of the disk rotary mechanism, hydrodynamic considerations, such as (a) rotational precision of a disk, (b) air flow and dust removal in the HDD, (c) a reduction in internal generation of heat and a uniformity in temperature, and (d) a reduction in disk flutter, are very important and are being taken as a matter of course. A description will hereinafter be made of these problems (a) through (d).

First, in the background art, there is a contrivance to address the aforementioned (b). A slider 18 to which the magnetic read sensor and the magnetic write transducer are attached is aerodynamically supported (or floated) with respect to the disk surface 13 by very thin air bearing flow. Hard disks must be kept in a dust-free environment because if dust particles get into the space between the disk surface and the slider, they will often destroy the data stored on the disk. Therefore, in the HDD fabrication process, hard disks are kept in an extremely clean room and are hermetically sealed so that a foreign substance does not get into the HDD. On the other hand, it cannot be avoided that internal dust particles will appear in the HDD later on. This is due to degradation of elements during the rotational sliding motion of a disk by a motor, the rotational sliding motion of a rotary actuator by a VCM, and the sliding motion of other elements.

Hence, a filter is often used to perform a cleaning operation to keep the interior of the HDD clean. In order to effectively remove dust particles with a filter, the air flow in the HDD is adjusted. For this reason, various contrivances for changing air flow can be found in background art. A pressure baffle 40 shown in FIG. 2 is an example of the contrivances and takes in air flow developed by rotation of a disk and filters air with a filter 50. Even if the pressure baffle 40 and the filter 50 are present, the disk 12 is substantially enclosed by the housing 30.

A contrivance to address the aforementioned (c) is known in background art. Various return paths for air flow are provided to cool internal parts which generate heat. Flow rate is increased at a place where a large quantity of heat is generated, thereby making the interior temperatures of the HDD uniform.

Now, consider a countermeasure for the aforementioned (a). The problem with the rotational precision can be due to, for example, ill-balanced disk weight distribution, a disk eccentricity from a rotational center, and deformation of the disk itself by motion resulting from rotation. In order to prevent the deformation of the disk caused by rotation of the disk, increasing the thickness of the disk to enhance its bending rigidity can be an effective solution. However, this conflicts with the miniaturization and weight reduction of the HDD, and therefore may not be said to be an effective solution.

Next, consider the aforementioned (d). For rotating (or moving) bodies, problems of a natural oscillation frequency cannot be avoided. The "disk flutter" used herein means the vibration of a disk which occurs at the resonance frequency of the disk. The disk vibration influences the precise positioning of a head, so in the case where thin and high-density disks must be used, further consideration to resonance becomes important.

In addition, the problem becomes noticeable in the case where the number of revolutions of a disk is high. When the number of revolutions of a disk is extremely high, the air flow developed by rotation of the disk is faster. When this high-speed air flow contacts the exterior walls of the HDD and the complicated structure of internal components, the air flow will become turbulent. Air flow having turbulence is called "turbulent flow", and it contains temporally and spatially irregular fluctuation. The turbulent flow gives successive change to the rotary motion of a disk, that is, successive motion. This is "excitation" with respect to the rotary motion of a disk. Particularly, it becomes important to consider influence on the disk flutter at the resonance frequency.

Now, consider how air flow is developed. In the case where a disk is rotating at a circumferential speed of v with respect to the circumferential direction of the disk (counterclockwise direction in FIG. 2), the disk surface gives a shearing action to air near the surface.

In FIG. 2, if the angular velocity of a disk is taken to be $\omega$ and the radial position on the disk surface is taken to be r, a relation of $V=r\omega$ will be established. That is, when r=0 (rotational center of a disk), V=0 and therefore no shearing action occurs, and when r=R (outmost circumference of a disk), V=Rω. Therefore, the maximum shearing action occurs at the maximum speed. Thus, the circumferential speed is gradually increased, as the radius of the disk is increased from the disk center toward the outer circumference. The air nearest to the rotational shaft (e.g., the spindle 14) forms laminar flow, because there is less shearing action between the disk surface 13 and the air mass since the circumferential speed is slower in the inner side of the disk than in the outer side. On the other hand, as the radius of the disk is increased from the rotational shaft toward the outer circumference, air flow on the disk surface is disturbed and therefore becomes turbulent flow.

As the disk is rotated, air near the disk surface flows from the rotational central portion (inner track) toward the outer circumference (outer track) due to a difference in circumferential speed and centrifugal force. For this reason, air pressure is high at the outer circumference of the disk and is low (negative pressure) at the inner circumference. Air mass is present between the disk and the exterior wall (or cover exterior wall) of housing 30; and in the case of a plurality of disks, air mass is present between adjacent disks (e.g., disks 12 and 12' or disks 12' and 12" in FIG. 1). For the aforementioned reasons, the air mass is drawn radially out to the outer side of the disk and is finally drawn out to the outermost circumference R. Thus, in the outermost circumference (circumferential edge) of the disk and the vicinities, the air flow is in a hydrodynamically complicated state.

Of course, air mass is disturbed not only by an increase in the disk surface speed which destroys a laminar boundary layer, but it can also be disturbed by the actuator extending between disks, including the suspension 20 and the actuator arm 22.

It is believed that a turbulence in air flow is mainly caused by the mixing of air flow going out of the disk surface and air flow (return flow) coming into the disk surface. This turbulence is believed to be conspicuous near the outermost circumference (circumferential edge) R of the disk. Since the housing and the cover are present, the return flow of air from the housing and cover is a phenomenon which cannot be avoided. The hydrodynamically mutual action between the disk outermost circumference and the housing 30 (or the cover) cannot be avoided.

If a flow straightening plate is provided at the outer circumferential portion of the disk, the mixing between air flow going out of the disk and the return flow can be reduced. Therefore, a straightening plate can reduce a turbulence in air.

In high density and large capacity HDDs, high precision is required in positioning a head over circular data tracks concentrically formed in the radial direction of the disk. That is, it is important for high precision head positioning to make rotations of a disk as uniform as possible. It is undesirable to excite disk flutter by turbulent flow.

In addition, stacked disks operate as a pump which attempts to separate air mass from the disk circumference. This pump operation and frictional loss associated with it are undesirable because it consumes a very large quantity of energy. Furthermore, there is a need to accelerate standing air near the circumferential edge of the disk to the circumferential speed of the rotating disk, and this requires additional energy for rotating the disk.

The adverse effect of air mass near the circumferential edge of the disk is undesirable from the standpoint of saving energy. Extra drive force must be given to the VCM to rotate the disk, and therefore power dissipation becomes large. The energy which is consumed due to air turbulence (vortex motion) caused by turbulent flow is also wasteful. If a flow straightening plate is provided near the circumferential edge of the disk, air mass can be separated from the circumferential edge of a rotating disk and the adverse effect of air mass can be suppressed.

The turbulence in air flow is a primary cause of acoustic noise. This is called aerodynamic sound and believed to be caused by unsteady air flow, for example, shearing flow such as unsteady vortex motion.

Although a shroud has been provided in background art as described above, in connection with the aforementioned problems (b) and (c), no attempt has been made to positively solve the aforementioned problems (d) and (a).

Since the aforementioned problems (a) and (d) are a serious problem associated with the assembly of the HDD, they will hereinafter be described.

FIG. 3 is a plan view for explaining problems which arise in HDD assembly sequence. As shown in FIG. 3, a portion of the housing is set at a predetermined angle range 70 so that the exterior circumference of a disk is shrouded. From the standpoint of aerodynamics, it is desirable to shroud a wider angle range of the circumferential edge of the disk. However, referring to FIG. 3(a), if a shroud is provided in an angle range which is too wide, the following problems will arise. Once the disk and the actuator are assembled within a housing, the shrouded portion will be an obstacle and it will be impossible to move the actuator in a direction indicated by a broken line 80 with respect to the disk. To avoid such inconvenience will require a special assembly method in which the disk and the actuator are dropped together into the housing while maintaining the actuator over the disk. This fabrication method is very intricate and it is anticipated that expensive equipment will be necessary.

An object of the present invention is to provide a shroud near the circumferential edge of a disk after assembly.

Another object of the present invention is to suppress disk flutter and enhance track positioning precision.

Still another object of the present invention is to reduce power dissipation and acoustic noise by preventing turbulent flow caused by an increase in the number of revolutions of a disk.

SUMMARY OF THE INVENTION

The shroud of the present invention can be attached to the housing of a disk drive such that a portion of an angle range of a circumferential edge of a disk is shrouded along the circumferential edge of the disk. The disk is rotatably attached to the housing of the disk drive.

The present invention also relates to a disk drive with the shroud of the present invention and a fabrication method for the disk drive of the present invention. The fabrication method is adapted for attaching the after assembly shroud to the housing of the disk drive and is performed according to novel assembly sequence.

BRIEF DESCRIPTION OF THE DRAWINGS

FIG. 7 is a graph showing non-repeatable runout (NRRO) varying with change in clearance between the disk and the shroud;

FIGS. 8(A) through 8(E) are schematic views showing nodes in 00 mode (umbrella mode), 01 mode, 02 mode, 03 mode and 011 mode, respectively, which are the resonance modes of the disk; and FIGS. 9(a) and 9(b) show the change in amplitude of a frequency in various modes in FIG. 8 with the change in clearance between the disk and the shroud.

DETAILED DESCRIPTION OF THE PREFERRED EMBODIMENTS

Figure 1:
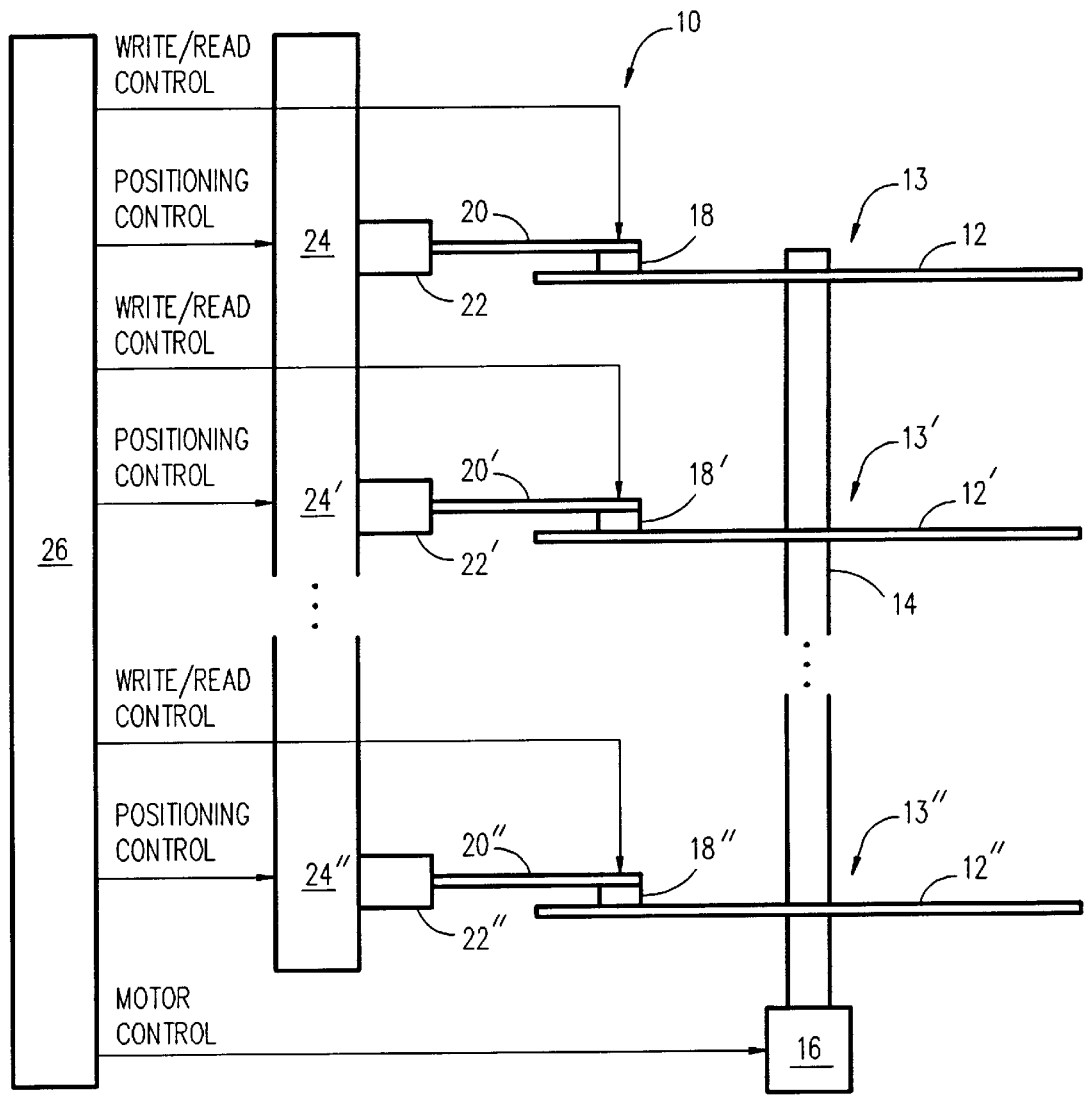
FIG. 1 is a block diagram showing the essential elements and operation of a hard disk drive (HDD)
Figure 2:
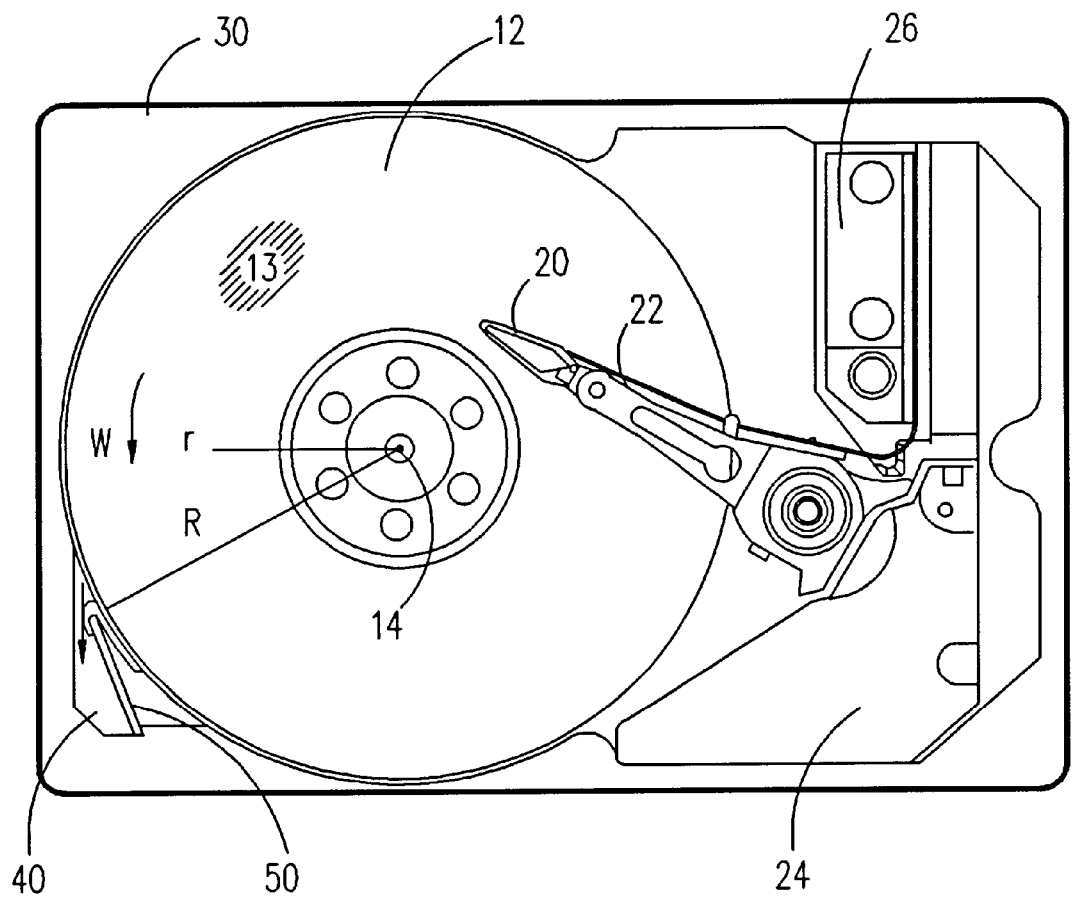
FIG. 2 is a plan view of the HDD shown in FIG. 1.
Figure 3A:
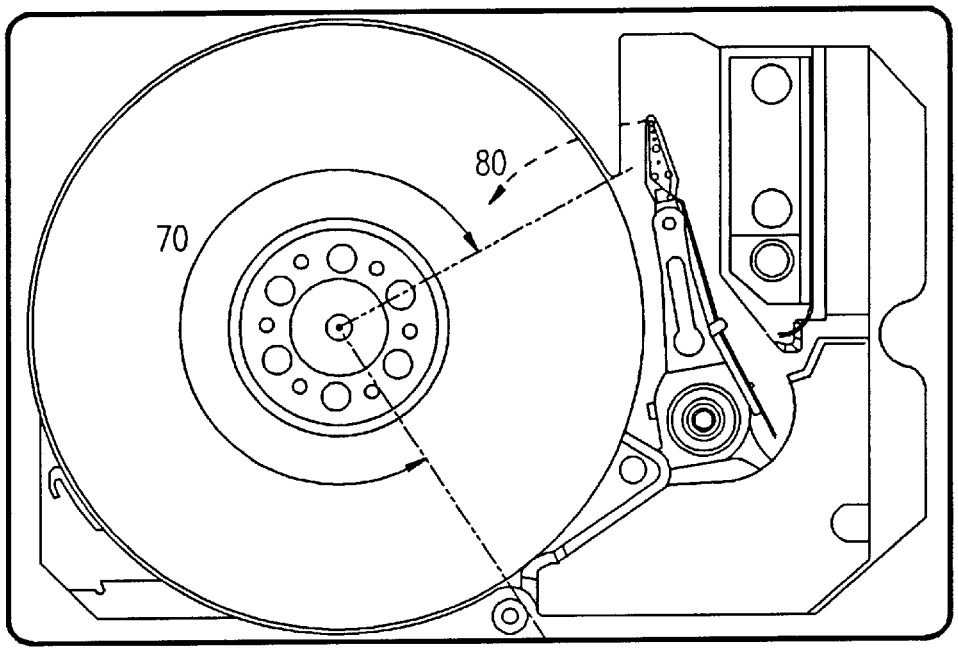
FIGS. 3(a) and 3(b) are plan views of the HDD.
Figure 3B:
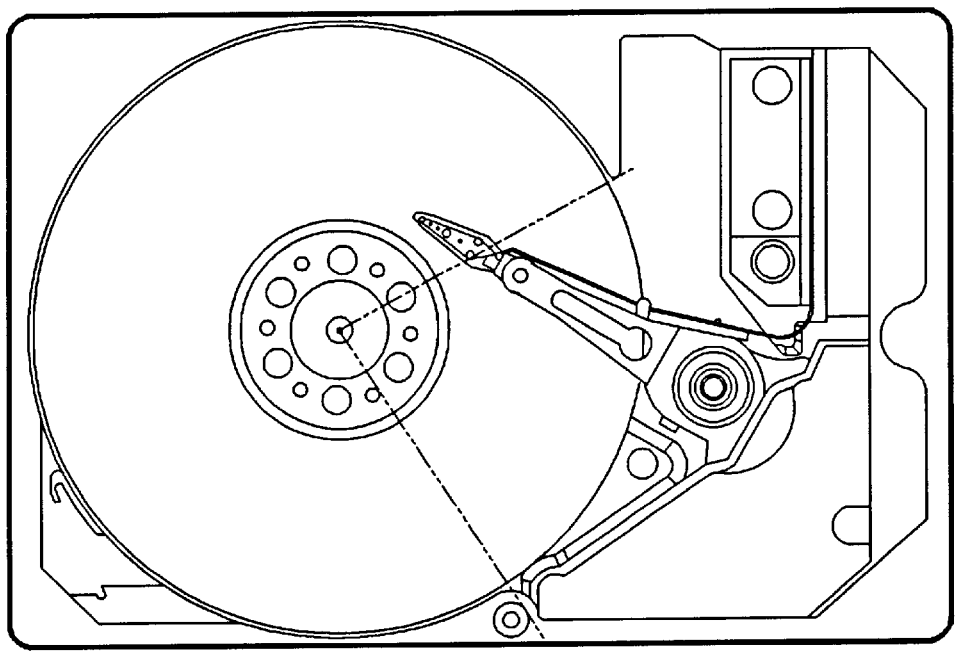
Figure 4A:
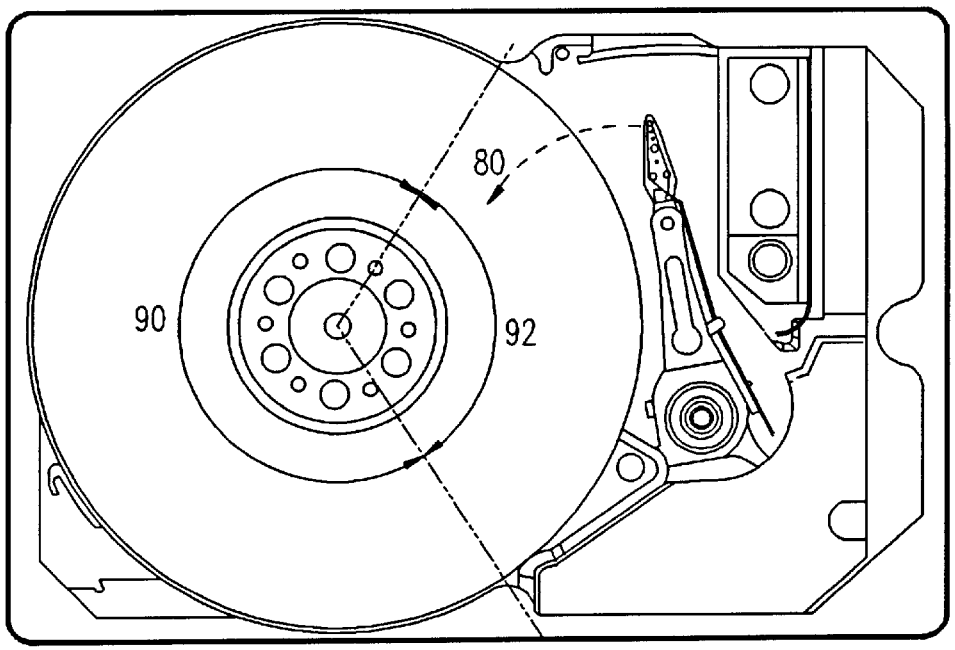
FIGS. 4(a) and 4(b) are plan views showing an assembly method of the present invention.
Figure 4B:
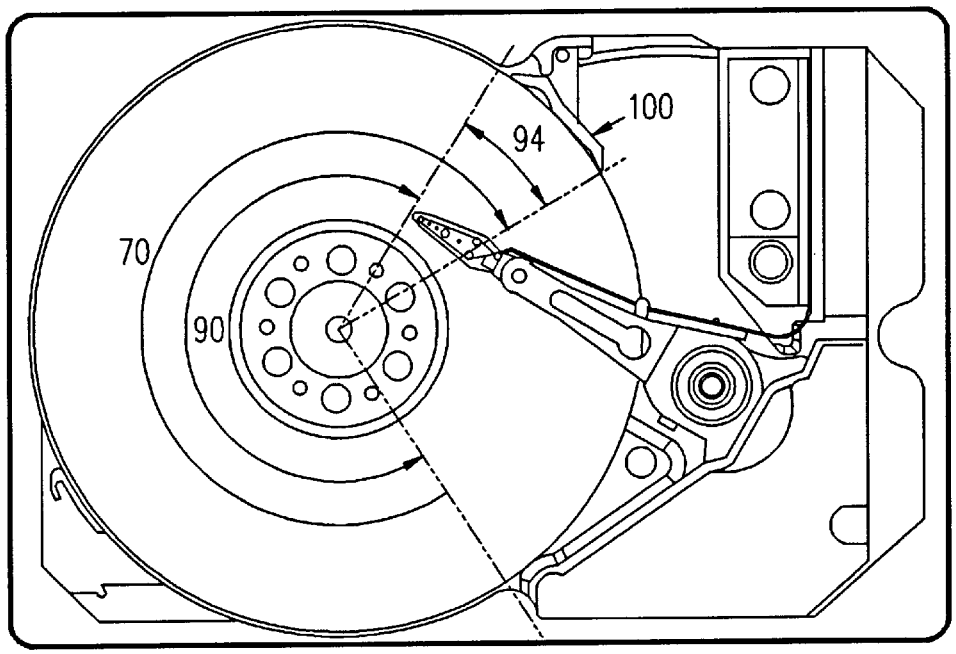

FIGS. 4(a) and 4(b) show an assembly method for the shroud of the present invention. A certain angle range 92 has been set for the actuator assembly. As shown in FIG. 4(a), the actuator can be moved in a direction indicated by a broken line 80 with respect to a disk. Then, as shown in FIG. 4(b), thereafter assembly component shroud 100 is moved to shroud a certain angle range 94 which is a portion of the angle range 92. When the shroud of the present invention is utilized as an after-assembly component, the assembly problems described in FIG. 3 can be eliminated. The term "after-assembly" used in the present invention is employed with such meaning. In FIG. 3 the angle range 70 is $\geq 180°$ and $<270°$. Of course, the technical ideas of the present invention are applicable in an angle range other than the aforementioned angle range.

Figure 5A:
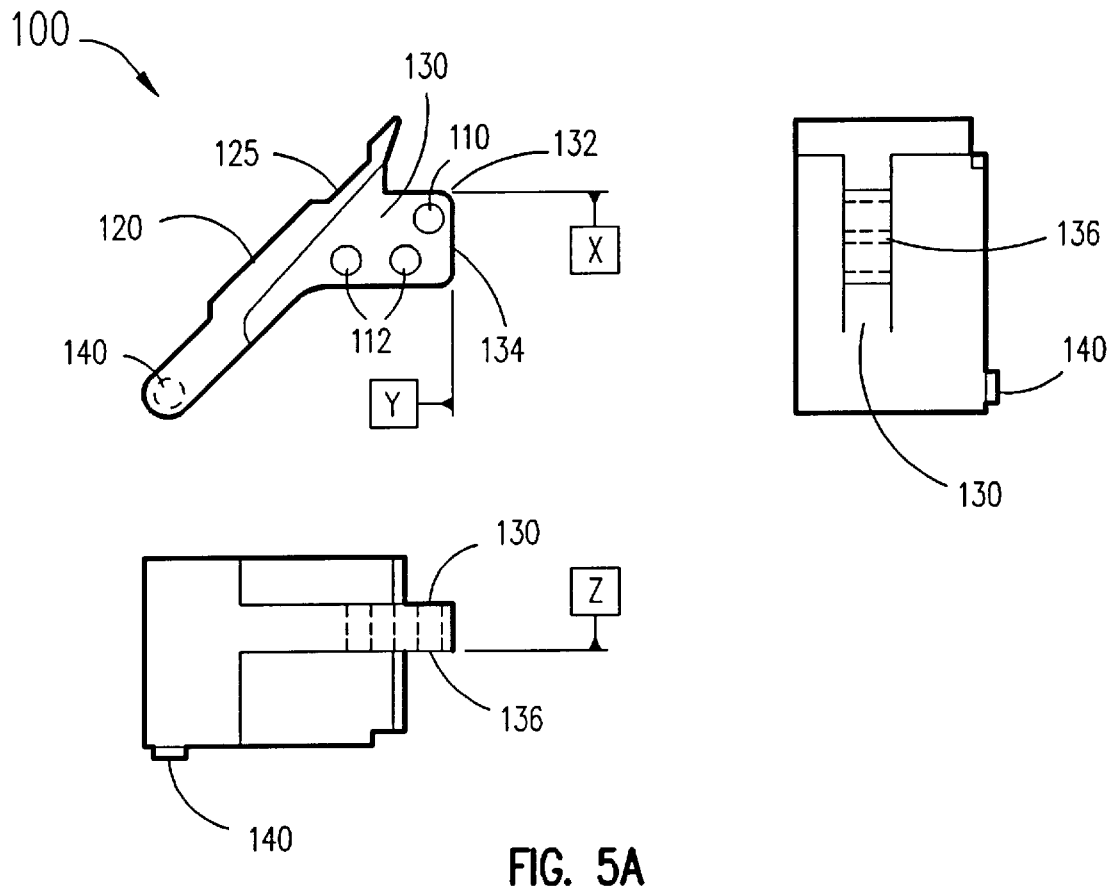
FIG. 5(a) shows front, side, and top views of the shroud of the present invention.
Figure 5B:
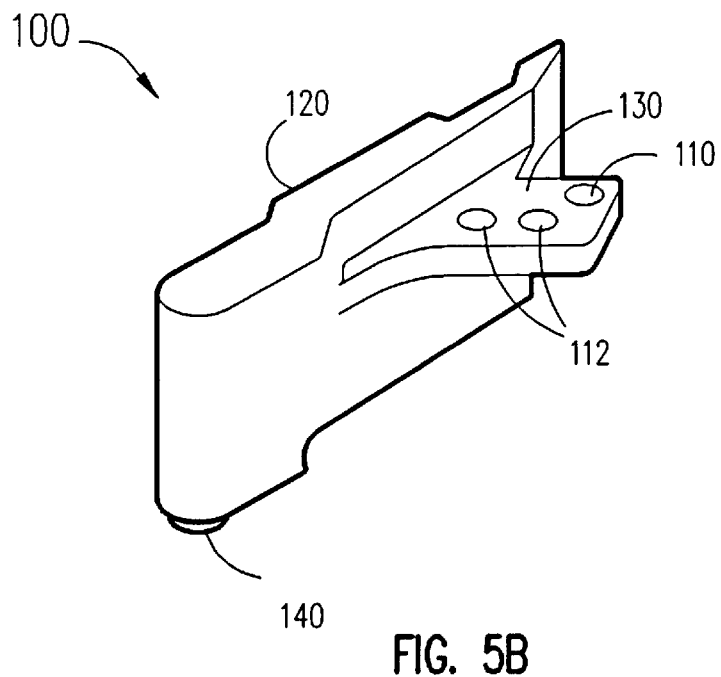
FIG. 5(b) is a perspective view of the shroud in FIG. 5(a)

FIG. 5 shows the details of an embodiment of the shroud 100 of the present invention. FIG. 5(a) shows front, side, and top views of the shroud 100, and FIG. 5(b) shows a perspective view of the shroud 100. The lug 130 of the shroud 100 is provided with an attaching hole 110. When the attaching hole 110 is vertically aligned with a hole provided on a side of the housing 30, the shroud 100 and the housing 30 can be connected together by inserting a screw into the holes. This assembly method keeps change on the HDD side to the minimum. Those skilled in the art can easily make modifications and variations of the assembly method. The X plane 132, Y plane 134, and Z plane 136 of the lug 130 can be utilized as a datum plane for positioning the shroud 100 with respect to the housing 30. These planes are able to make a contribution to a high precision attaching operation. Those skilled in this field can easily make other relative positioning methods. If a projection 140 is provided, a positioning operation with less offset can be made by inserting the projection 140 into a hole provided on the side of the housing 30.

A proximity surface 120 which is arranged in close proximity to the circumferential edge of the disk has curvature so that it can be positioned along the circumferential edge of a disk. The recess 125 of the shroud 100 may be provided for the purpose of preventing the shroud 100 from contacting the point end of the actuator and disturbing movement of the actuator in a range in which the actuator is moved during a positioning operation. However, it is desirable, if possible, to avoid this recess 125 from an aerodynamic point of view. The expression of "along the circumferential edge of a disk" is intended to mean that in a plan view of the shroud the surface of the proximity surface 120 is positioned at a substantially equal distance over the entire circumferential edge of a disk. Expressing this geometrically, it is intended to mean that the curvature of the proximity surface 120 has been set to R+C where R is the radius of a disk and C is the shortest distance between the disk and the proximity surface. The "distance between a disk and a shroud" or "clearance between a disk and a shroud" is referred to as C. From a hydrodynamic point of view, so that air flow is disturbed as little as possible, the whole external form of the shroud 100 is a smooth curved line. Also, the boundary portion between adjacent surfaces of the shroud 100 is formed as smoothly as possible. Two holes 112 are utilized for clamping the shroud 110 at the time of assembly.

In determining the degree of the angle range 94 shrouded by the shroud, two limitations are mainly considered. The first limitation is the problem of precision positioning of the shroud with respect to the housing. Although it is desirable to shroud a wider angle range from a hydrodynamic point of view, a positioning operation for making clearance distances C between the disk and the shroud uniform is difficult. In connection with this, if the projection 140 and the hole provided on the side of the housing 30 are utilized, they can ensure a certain degree of precision positioning. The second limitation is that rotational movement of the actuator is not disturbed in its operational range.

Figure 6A:
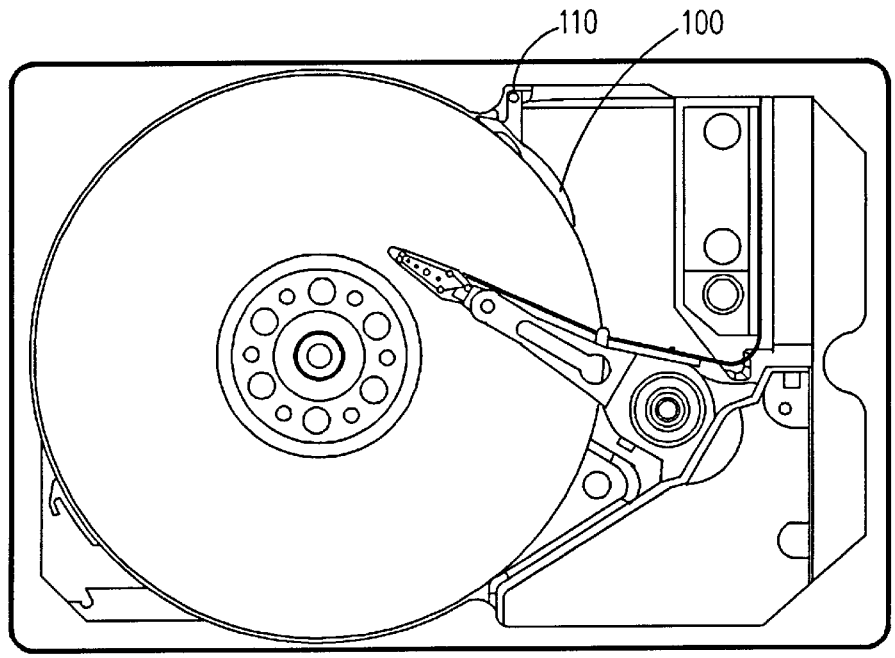
FIGS. 6(a) through 6(c) are plan and perspective views of the HDD with the shroud of the present invention.
Figure 6B:
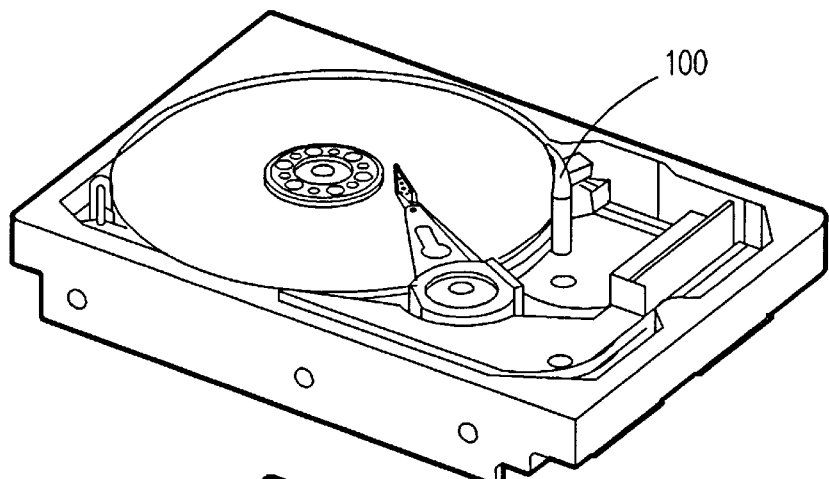
Figure 6C:
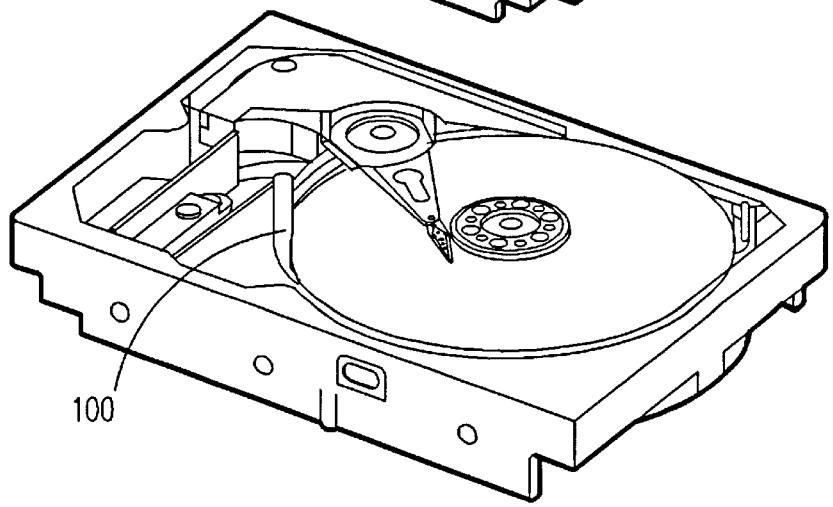

FIG. 6 shows the state in which the shroud 100 has been attached to the interior of the HDD. FIG. 6(a) is a plan view and FIGS. 6(b) and 6(c) are perspective views. Referring to FIGS. 6(b) and 6(c), one can grasp the plurality of components which have influence on air flow in the HDD, the spatial relation therebetween, and air paths. In the finished HDD, a lid is provided on the upper surface to hermetically seal the HDD.

It is desirable that the material of the shroud be plastic, because plastic material is inexpensive and can be mass-produced by a metal mold and a certain degree of precision can be expected by a metal mold. In addition, since it is a fixed component, there is no need to consider dust generation. This embodiment of the present invention uses polycarbonate.

Following is an evaluation of the disk flutter reduction when the shroud 100 has been installed. As a means of evaluating the degree of disk flutter, a non-repeatable runout (NRRO) is employed as an evaluation index. This NRRO represents the runout which does not synchronize with rotation of a disk. Runout having the same amplitude for each revolution, such as the runout of a disk having mechanical eccentricity, can be taken as an example of the runout which synchronizes with rotation of a disk. The runout which does not synchronize with rotation of a disk excludes such runout that synchronizes with rotation of a disk. This will be described in further detail. In the case where a disk is rotated at a speed of 7200 rpm, the amplitude becomes large at 120 Hz (7200 rpm/60 s) and at 240 Hz, 360 Hz, (of the higher harmonic wave which is a repeatable runout). However, since these are the same for each cycle, they are not important as an object of evaluation. On the other hand, the NRRO becomes important because it has a direct influence on the precise positioning on a data track.

The major causes of the NRRO include 1) the resonance frequency of a disk, 2) the runout of a spindle for a disk and the natural frequency of a bearing, and 3) the resonance frequency of the entire disk-motor system. Among these, 1) is disk flutter which is the problem of the present invention. Cause 2) arises due to a difference between balls used in the ball bearing of the spindle or an error from a true sphere. Since 3) includes a motor as an object of rotation, the natural frequency appears at a relatively lower frequency. In FIG. 9, the aforementioned 3) also appears in the evaluation result.

FIG. 7 is a graph showing how the NRRO is changed by changing the clearance between the disk and the shroud. Although the components used in the experiments shown in FIGS. 7(a) and 7(b) are substantially the same, the experimental results of FIGS. 7(a) and 7(b) are slightly different from each other due to variations in assembly and individual differences between components. In FIGS. 7(a) and 7(b), there is shown the case where the number of revolutions of a disk is 5400 rpm (90 Hz), the case where the number of revolutions is 7200 rpm (120 Hz), and the case where the number of revolutions is 7800 rpm (130 Hz). As can be understood from this graph, if the number of revolutions becomes higher, the NRRO will be larger. Also, while experiments have been made in a range in which a clearance is between 0.2 mm and 0.8 mm, it is found that a smaller clearance can reduce the NRRO. It is noted that if the shroud is separately formed as an after-assembly component, such clearance can easily be controlled. This clearance can be effectively controlled in cooperation with the high-precision attaching method for the shroud described in FIG. 5.

Resonance mode can be used as a method of evaluating vibration of a disk. First, for pitch, this is the resonance mode of the entire motor system and the resonance point of the disk system whose frequency is lowest. It is the aforementioned 3), the resonance frequency of the entire disk-motor system. The resonance mode has two resonance frequencies (− and +) in a direction of angle. Since a natural frequency exists during rotation, two frequencies are seen in a stopped stationary coordinate system.

Next, consider a resonance mode other than the aforementioned pitch. The resonance mode of a disk is generally represented by the number of nodes which the disk has in the radial direction and the angle direction. The node is a point at which the amplitude of a standing wave becomes 0 or minimum. FIGS. 8(A), 8(B), 8(C), and 8(D) are schematic views showing nodes in the 00 mode, 01 mode, 02 mode, and 03 mode of a disk. Solid lines other than a broken line representing the circumferential edge of a disk are all nodes; and at these nodes in each vibration mode, a disk is spatially fixed and does not vibrate or the amplitude becomes minimum. The case 8(A) where the outermost circumference of a disk is a node is called a 00 mode or umbrella mode, and particularly, in this mode a broken line and a solid line are superimposed with each other. A state such as that shown in 8(E) is called a 11 mode.

If sound occurring from the HDD is processed by a fast Fourier transformation (FFT) and the frequency component is analyzed, these resonance modes can be identified.

FIGS. 9(a) and 9(b) show how various modes in FIG. 8 appear on frequencies as a result of the fast Fourier transformation (FFT). Furthermore, FIG. 9(a) shows the case where the clearance between the disk and the shroud is 0.8 mm and FIG. 9(b) shows the case where the clearance between the disk and the shroud is 0.2 mm. Therefore, if FIGS. 9(a) and 9(b) are compared with each other, it will also be clear how the amplitude of the frequency in each mode is changed by the distance between the shroud and the disk. In this embodiment, the NRRO appearing in a direction along the rotational axis of the disk is measured. If FIG. 9 is caused to correspond to the modes shown in FIG. 8, reference character A in FIG. 9 is equivalent to the pitch (−) mode, B to the 01 (−) and 02 (−) modes of the disk, C to the 00 and pitch (+) modes of the disk, D to the 01 (+) mode of the disk, E to the 03 (−) mode of the disk, and F to the 02 (+) mode of the disk.

If a comparison is made between FIGS. 9(a) and 9(b), in FIG. 9(b) a reduction of about 40% in the amplitude is seen in all modes described in FIG. 8. That is, it has been observed that if the shroud gets closer to the disk, it is effective in suppressing disk flutter and pitch. However, since there is an attach tolerance of the disk to the housing and an attach tolerance of the shroud to the housing, it is difficult in manufacturing to put the shroud and the disk close together. However, it is noted that such a problem can be to some degree eliminated by the shroud of the present invention described in FIG. 5. Among the attach tolerances, the attach tolerance of the disk to the housing is the largest; and in this embodiment, it includes assembly or fit tolerances between the housing and the motor and between the motor and each disk.

Also, a position error signal (PES) can be employed as an index to evaluate the track positioning precision. Experiments have been conducted using PES to determine change in disk flutter without the use of the shroud. In this embodiment of the present invention, the width of a unit data track is divided into 256 ($2^8$) equal parts, and one part is defined as a unit of 1 PES. In the case where the shroud is provided, the NRRO can be enhanced by about 0.7 PES in comparison with the case where no shroud is provided. In the statistics, since 6 PES=1 σ, this enhancement of about 0.7 PES can be evaluated as an enhancement of about 10% in the precision positioning of the data track. According to the present invention, an after-assembly shroud can be provided near the circumferential edge of a disk, disk flutter can be suppressed, and track positioning precision can be enhanced.

We claim:

1. A disk drive comprising:

(a) a disk stack;

(b) a disk drive motor for rotating the disk;

(c) a housing for receiving the disk drive motor, the motor being positioned within the housing so that the circumferential edge of the disk stack is near the edge of the housing;

(d) an actuator having a magnetic head and rotatably attached to the housing for positioning the magnetic head over the disk stack with arcuate movement of the actuator; and (e) a shroud pivotally mounted for rotational movement in the housing near the circumferential edge of the disk stack, the shroud comprising a wall capable of being positioned adjacent the edge of the disk stack and within the arcuate pathway of the actuator.

2. The disk drive as set forth in claim 1, wherein the distance between said disk and said shroud is 0.8 mm or less.

3. The disk drive as set forth in claim 2, wherein the distance between said disk and said shroud is 0.2 mm or more.

* * * * *